W. COX.
FARE BOX.
APPLICATION FILED JUNE 1, 1914.
1,135,262. Patented Apr. 13, 1915.
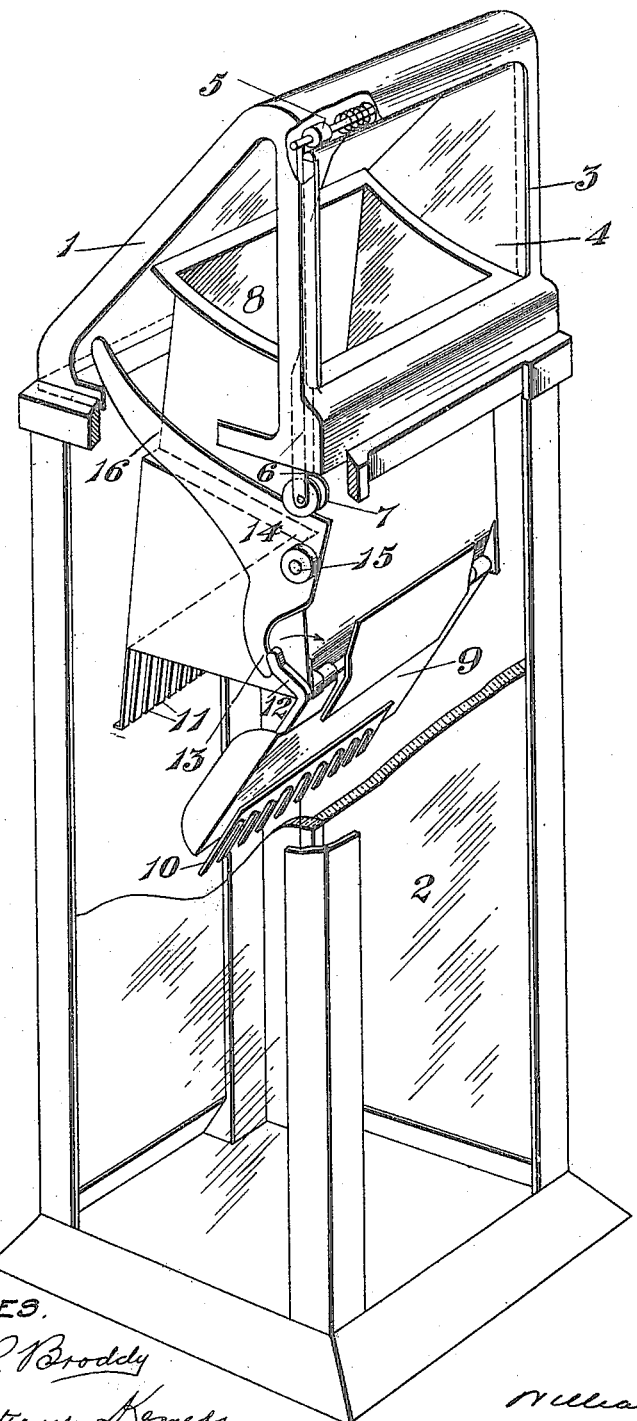
WITNESSES.
INVENTOR.

UNITED STATES PATENT OFFICE.

WILLIAM COX, OF TORONTO, ONTARIO, CANADA.

FARE-BOX.

1,135,262.　　　　　Specification of Letters Patent.　　　Patented Apr. 13, 1915.

Application filed June 1, 1914. Serial No. 842,291.

*To all whom it may concern:*

Be it known that I, WILLIAM COX, of the city of Toronto, in the county of York and Province of Ontario, Dominion of Canada, have invented certain new and useful Improvements in Fare-Boxes; and I hereby declare that the following is a full, clear, and exact description of the same.

My invention relates to a fare box in which the examining chamber is provided with a hinged trap controlling the passage therethrough and operated by a lever actuated by the movements of the cover which closes the entrance to the examining chamber as hereinafter set forth and particularly pointed out in the claims.

In the drawings the figure is a broken perspective view of the fare box showing the relative construction and arrangement of the parts.

Like characters of reference refer to like parts throughout the specification and drawings.

In the top 1 of the examining chamber 2 is the fare receiving entrance 3 having a cover 4 provided with a spring tensioned hinge 5 which permits of the cover being opened and automatically closes it, and depending from the cover 4 is an arm 6 to which is journaled a roller 7. Within the examining chamber 2 is a fare chute 8, and hinged to one side of the fare chute, at its lower end, is a trap 9, the free edge of which is provided with serrations or fingers 10. The lower end of the opposite side of the chute 8 is provided with serrations or depending fingers 11 which intermesh with the serrations or fingers 10 so that when the trap is closed it will be impossible for a fare to enter between the lower edge of the chute and the inner side of the trap. The trap 9 is provided with a crank arm 12 which is engaged by the short arm 13 of the operating lever 14 fulcrumed at 15 within the magazine; the long arm 16 of the lever being engaged by the roller 7.

In the use of the fare box it is necessary to press the cover 4 inward so that the fare can be dropped into the chute 8. During the inward movement of the cover 4 the roller 7 travels along the long lever arm 16 from the vicinity of the fulcrum 15 toward the free end of the arm and during its travel presses that end of the lever arm downward, rocking the lever 14 on its fulcrum 15 and causing the short lever arm 13 to move the crank arm 12 in the direction indicated by arrow. This movement of the crank arm 12 raises the trap from the position shown in full lines in the drawings so that it will close the lower end of the chute and prevent the fares in the examining chamber from being extracted therefrom when the cover is in its open position.

When the fare is admitted and the opening pressure is removed from the cover 4 the spring tensioned hinge 5 causes the cover to automatically close the entrance 3 and when the cover is closed the roller 7 resumes the position shown in full lines on the drawing. During the closing movement of the cover 4 the roller 7 travels toward the fulcrum 15 and permits the lever 14 to rock on its fulcrum into the position shown in full lines in the drawings so that the short lever arm 13 will release the crank arm 12 and permit the trap to open and assume an inclined position with relation to the chute.

By means of this construction, I am able to immediately deposit the fare in the examining chamber and to effectively shut off all communication between the examining chamber and the fare receiving entrance so that the fares cannot be extracted therefrom.

Having thus fully described the nature of my invention, what I claim as new and desire to secure by Letters Patent, is:

1. In a fare box comprising an examining chamber having a fare receiving entrance, the combination of a trap hinged within the examining chamber to close the passage therethrough, a bell crank lever, one arm of which is in operative relation with the trap, a movable cover for closing said entrance, and means carried by the cover engaging the other arm and actuating the lever for the movements of the trap.

2. In a fare box comprising an examining chamber having a fare receiving entrance, the combination of a trap hinged within the examining chamber to close the passage therethrough, said trap having a crank arm, a bell crank lever fulcrumed within the examining chamber, one arm of which is continually in engagement with the crank arm of the trap, a movable cover for closing said entrance, and means carried by the cover engaging the other arm of the bell crank
5 lever and actuating it to close the trap during the opening movement of the cover, the trap opening by gravity during the closing movement of the cover and automatically restoring the bell crank lever to an inoperative position.

Toronto, May 20th, 1914.

WILLIAM COX.

Witnesses:
 CHAS. H. RICHES,
 PAR MONTIGNY KENNEDY.

Copies of this patent may be obtained for five cents each, by addressing the "Commissioner of Patents, Washington, D. C."